United States Patent
Wiesbauer et al.

(10) Patent No.: US 9,984,691 B2
(45) Date of Patent: May 29, 2018

(54) SYSTEM FOR A TRANSDUCER SYSTEM WITH WAKEUP DETECTION

(71) Applicant: Infineon Technologies AG, Neubiberg (DE)

(72) Inventors: Andreas Wiesbauer, Poertschach (AT); Christian Jenkner, Klagenfurt (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days. days.

(21) Appl. No.: 15/224,340

(22) Filed: Jul. 29, 2016

(65) Prior Publication Data

US 2016/0336013 A1    Nov. 17, 2016

Related U.S. Application Data

(63) Continuation of application No. 14/203,082, filed on Mar. 10, 2014, now Pat. No. 9,445,173.

(51) Int. Cl.
*H04R 25/00* (2006.01)
*G10L 15/28* (2013.01)
(Continued)

(52) U.S. Cl.
CPC ............ *G10L 15/285* (2013.01); *G06F 3/162* (2013.01); *H04R 1/08* (2013.01); *H04R 3/00* (2013.01);
(Continued)

(58) Field of Classification Search
CPC .............. H04R 1/1016; H04R 1/1041; H04R 2460/11; H04R 25/656; H04R 1/1058;
(Continued)

(56) References Cited

U.S. PATENT DOCUMENTS 5,280,650 A  *  1/1994  Sobti .................... H04B 1/1615
                                            340/7.33
5,535,281 A  *  7/1996  Gulick ................ H01L 27/0207
                                            381/122
(Continued)

FOREIGN PATENT DOCUMENTS

CN        101075374 A      11/2007
CN        102298709 A      12/2011
(Continued)

OTHER PUBLICATIONS

Avago Technologies, AFBR-78D1SZ MicroPOD 12x10G Receiver Module, Electronic Circuit Diagram, Sep. 7, 2008, 4 pages.
(Continued)

*Primary Examiner* — Matthew Eason
*Assistant Examiner* — Julie X Dang
(74) *Attorney, Agent, or Firm* — Slater Matsil, LLP (57) ABSTRACT

According to embodiments described herein, a circuit includes an interface circuit configured to be coupled to a transducer and a detection circuit. The interface circuit is configured to provide a digital output signal to a signal input terminal of a processing circuit. The detection circuit is configured to receive the digital output signal and provide a low power enable signal to a low power enable terminal of the processing circuit. In the various embodiments, the digital output signal is based on a transduced signal from the transducer and the low power enable signal is determined by comparing the digital output signal with a first threshold.

23 Claims, 6 Drawing Sheets (51) Int. Cl.
*H04R 1/08* (2006.01)
*H04R 29/00* (2006.01)
*H04R 3/00* (2006.01)
*H04R 19/00* (2006.01)
*G06F 3/16* (2006.01)

(52) U.S. Cl.
CPC ......... H04R 19/005 (2013.01); H04R 29/004 (2013.01); *H04R 2201/003* (2013.01); *H04R 2420/05* (2013.01)

(58) Field of Classification Search
CPC .. H04R 1/1091; H04R 25/652; H04R 25/654; H04R 19/005
USPC .......................................... 381/174, 107–111
See application file for complete search history.

(56) References Cited

U.S. PATENT DOCUMENTS

| | | | |
|---|---|---|---|
| 5,563,952 A | 10/1996 | Mercer | |
| 5,771,226 A * | 6/1998 | Kaku | H04L 1/0039 370/232 |
| 6,272,465 B1 * | 8/2001 | Hewitt | G06F 7/026 704/201 |
| 6,744,888 B1 * | 6/2004 | El-Kik | H04M 3/005 379/399.01 |
| 2001/0033648 A1 | 10/2001 | Ching | |
| 2005/0169350 A1 * | 8/2005 | Schilling | H04B 1/707 375/142 |
| 2006/0034472 A1 * | 2/2006 | Bazarjani | H04R 19/005 381/111 |
| 2007/0252745 A1 * | 11/2007 | Garlapati | H03M 1/002 341/156 |
| 2008/0204145 A1 * | 8/2008 | Dow | H03F 1/0261 330/285 |
| 2008/0310645 A1 * | 12/2008 | Itabashi | G10K 11/1782 381/71.6 |
| 2009/0179789 A1 * | 7/2009 | Haughay, Jr. | H04M 1/05 341/176 |
| 2009/0182913 A1 * | 7/2009 | Rosenblatt | H04M 1/05 710/72 |
| 2010/0309904 A1 * | 12/2010 | Couse | H04M 1/2535 370/352 |
| 2011/0022892 A1 | 1/2011 | Zhang et al. | |
| 2011/0064246 A1 | 3/2011 | Loeppert et al. | |
| 2011/0080367 A1 | 4/2011 | Marchand et al. | |
| 2012/0268105 A1 | 10/2012 | Mann et al. | |
| 2013/0342521 A1 | 12/2013 | Griffiths et al. | |

FOREIGN PATENT DOCUMENTS

| | | | |
|---|---|---|---|
| CN | 202512508 U | 10/2012 | |
| CN | 103052146 A | 4/2013 | |
| WO | WO 2014046673 A1 * | 3/2014 | ............. H02J 9/062 |

OTHER PUBLICATIONS

Digitial SiSonic Microphone, Product Data Sheet, SPM0423HD44-WB, www.knowles.com, Jun. 18, 2013, 13 pages.

\* cited by examiner

SYSTEM FOR A TRANSDUCER SYSTEM WITH WAKEUP DETECTION

This is a continuation application of U.S. application Ser. No. 14/203,082, entitled "System and Method for a Transducer System with Wakeup Detection," which was filed on Mar. 10, 2014 and is incorporated herein by reference.

TECHNICAL FIELD

The present invention relates generally to transducer systems, and, in particular embodiments, to a system and method for a Transducer System with Wakeup Detection.

BACKGROUND

Transducers convert signals from one domain to another and are often used in sensors. One common sensor with a transducer that is seen in everyday life is a microphone that converts sound waves to electrical signals.

Microelectromechanical system (MEMS) based sensors include a family of transducers produced using micromachining techniques. MEMS, such as a MEMS microphone, gather information from the environment by measuring the change of physical state in the transducer and transferring a transduced signal to processing electronics that are connected to the MEMS sensor. MEMS devices may be manufactured using micromachining fabrication techniques similar to those used for integrated circuits.

MEMS devices may be designed to function as, for example, oscillators, resonators, accelerometers, gyroscopes, pressure sensors, microphones, and micro-mirrors. Many MEMS devices use capacitive sensing techniques for transducing the physical phenomenon into electrical signals. In such applications, the capacitance change in the sensor is converted to a voltage signal using interface circuits.

One such capacitive sensing device is the MEMS microphone. A MEMS microphone generally has a deflectable membrane separated by a small distance from a rigid backplate. In response to a sound pressure wave incident on the membrane, it deflects towards or away from the backplate, thereby changing the separation distance between the membrane and backplate. Generally, the membrane and backplate are made out of conductive materials and form "plates" of a capacitor. Thus, as the distance separating the membrane and backplate changes in response to the incident sound wave, the capacitance changes between the "plate" and an electrical signal is generated.

Generally, a MEMS microphone sends the electrical signals generated in response to incident sound waves to some type of interface and/or processing electronics that may perform different functions depending on the application. As applications advance and increase in number, numerous challenges present themselves that produce inventive solutions for improving and innovating transducer systems and interface electronics.

SUMMARY OF THE INVENTION

According to embodiments described herein, a circuit includes an interface circuit configured to be coupled to a transducer and a detection circuit. The interface circuit is configured to provide a digital output signal to a signal input terminal of a processing circuit. The detection circuit is configured to receive the digital output signal and provide a low power enable signal to a low power enable terminal of the processing circuit. In the various embodiments, the digital output signal is based on a transduced signal from the transducer and the low power enable signal is determined by comparing the digital output signal with a first threshold.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Description is made with respect to various embodiments in a specific context, namely microphone transducers, and more particularly, MEMS microphones. Some of the various embodiments described herein include MEMS transducer systems, MEMS microphone systems, interface circuits for transducer and MEMS transducer systems, MEMS microphone systems with wake-up detection, wake-up detection circuits, sound detection circuits, and transducer systems with wake-up detection. In other embodiments, aspects may also be applied to other applications involving any type of sensor or transducer converting a physical signal to another domain and interfacing with electronics according to any fashion as known in the art.

According to various embodiments, a microphone system with wake-up detection is described herein. In particular embodiments, a MEMS microphone system with wake-up detection is described; however, any type of transducer system with wake-up detection may be implemented according to the concepts described herein.

In various systems and usage environments, increased power efficiency of a transducer system may be advantageous. For example, microphones, and particularly MEMS microphones, are often included in mobile applications such as cell phones, laptops, tablets, and various other embedded systems. In such mobile applications, the battery life is often important to end users and the power efficiency is important in determining the battery life of the mobile application.

Thus, in various embodiments a MEMS microphone system with wake-up detection is described with increased power efficiency.

According to various embodiments, a transducer system includes two modes of operation: a regular operation mode and a low power operation mode. In the low power operation mode, various components of the transducer system are disabled in order to conserve power. In the regular operation mode, the various components may be enabled in order to provide proper signal conversion (i.e. transduction) from physical signals into the electrical domain.

In the particular embodiment of a MEMS microphone system, a MEMS sound transducing element may be coupled to an amplifier and the amplifier to an analog to digital converter (ADC). A wake-up detection circuit is coupled to the signal path between the amplifier and an audio processor. In various embodiments, the wake-up detection circuit detects activity above or below a specific threshold and enables or disables the ADC and/or other components based on the level of activity. In such embodiments, the low power operation mode reduces power consumption during reduced activity of the MEMS microphone system by disabling various components, such as the ADC, and the regular operation mode increases the performance during operation by enabling various components. Description is now made in reference to the figures.

Figure 1A:
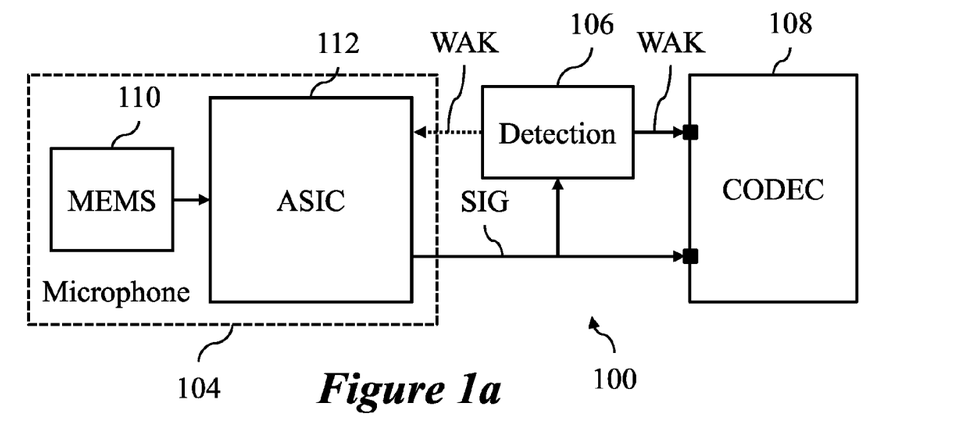
FIGS. 1a-1c illustrate block diagrams of embodiment microphone systems.
Figure 1B:
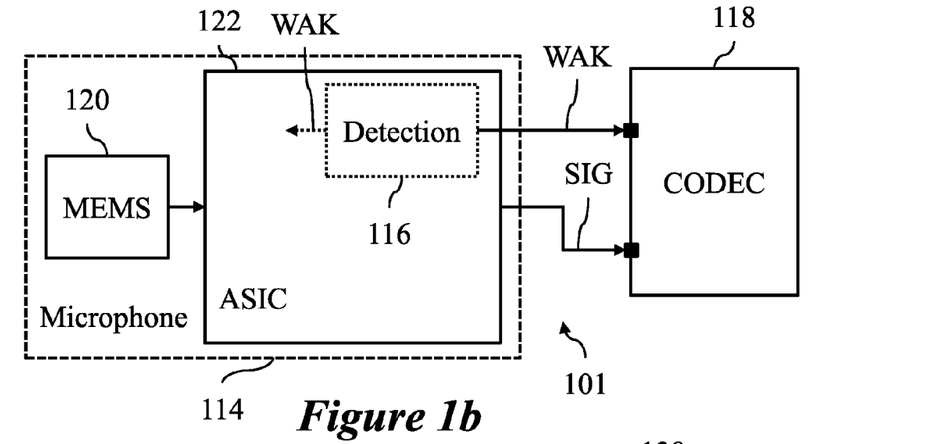
Figure 1C:
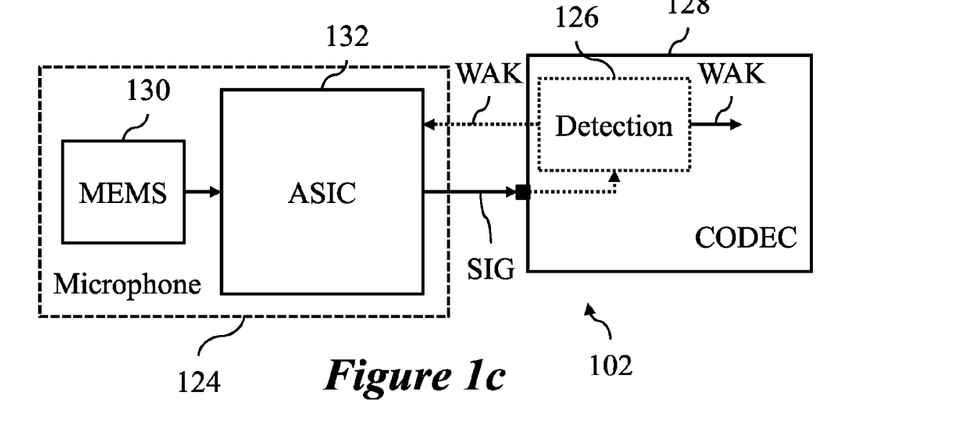

FIGS. 1a-1c illustrate block diagrams of embodiment microphone systems 100, 101, and 102. FIG. 1a illustrates microphone system 100 including microphone 104, detection circuit 106, and CODEC 108. According to various embodiments, IC 112 is an interface circuit for MEMS 110. IC 112 may be an application specific integrated circuit (ASIC) in some embodiments. MEMS 110 may be a capacitive MEMS microphone that provides an electrical signal to IC 112. The electrical signal may be a transduced signal related to a sound wave incident on a deflectable membrane of MEMS 110. IC 112 receives the transduced electrical signal from MEMS 110, amplifies the signals, and provides signals on output line SIG to an audio processor 108 that is shown as CODEC 108.

According to various embodiments, detection circuit 106 receives and monitors signals on output line SIG coming from IC 112. Detection circuit 106 may compare the value on output signal SIG to a wake-up threshold. In some embodiments, detection circuit 106 may compare an extracted parameter related to acoustic activity in the microphone environment, such as a rectified and filtered value, for example. In such embodiments, rectification and filtering may be performed in IC 112 or in detection block 106. If the value or parameter on output line SIG is below the wake-up threshold, detection circuit 106 provides a disable or sleep signal on wake-up line WAK to CODEC 108. If the value or parameter on output line SIG goes above the wake-up threshold, detection circuit 106 provides a wake-up signal on wake-up line WAK to CODEC 108. In some embodiments, once the wake-up threshold has been reached, a hysteresis may be implemented with a disable threshold lower than the wake-up threshold. The operation of the detection circuit is further described below in reference to the other figures.

In various embodiments, when CODEC 108 receives the wake-up signal, CODEC 108 enters a normal operation or high performance mode. When CODEC 108 receives the disable or sleep signal, CODEC 108 enters a low power mode with various components disabled or operating with lower power consumption than in the normal operation or high performance mode. In various embodiments, detection circuit 106 may also provide wake-up line WAK to IC 112 in order to enable and disable various components within IC 112. For example, IC 112 may include an analog to digital converter (ADC) that is disabled during the low power mode or biasing elements that are enabled during normal operation in order to increase the bias currents of IC 112 and provide lower noise and/or higher linearity performance.

FIG. 1b illustrates microphone system 101 including microphone 114, detection circuit 116, and CODEC 118. According to various embodiments, detection circuit 116 is included in IC 122. Similar to the operation of detection circuit 106 above, detection circuit 116 operates as a portion of IC 122 and monitors output signals supplied to output line SIG. Sound signals are transduced by MEMS 120 and supplied to IC 122 where the transduced signals may be amplified. Detection circuit 116 compares the transduced and amplified signals, or an extracted parameter related to the signals, against the wake-up threshold and provides a wake-up signal on wake-up line WAK if the signals are above the wake-up threshold. Microphone 114 is coupled to CODEC 118 and provides the wake-up signal on wake-up line WAK and output signals on output line SIG. In various embodiments, wake-up line WAK may provide wake-up signals to both CODEC 118 and other components within IC 122.

FIG. 1c illustrates microphone system 102 including microphone 124, detection circuit 126, and CODEC 128. According to various embodiments, detection circuit 116 is included in CODEC 128. In such embodiments, IC 132 receives transduced signals from MEMS 130 and outputs signals on output line SIG to CODEC 128. Detection circuit 126 monitors signals received by CODEC 128 and compares the received signals, or an extracted parameter related to the signals, to a wake-up threshold in order to generate wake-up signal WAK internally. Wake-up signal WAK is then provided to various other components internally, such as an ADC for example. In some embodiments, wake-up signal WAK may also be provided to IC 132 in order to enable and/or disable various components.

In various different embodiments, the components in microphone systems 100, 101, and 102 may be implemented with varied functions. For example, IC 112, 122, or 132 may each be implemented with or without an ADC. If the IC (112, 122, or 132) includes an ADC, output signal SIG may be a digital signal that is modulated in some way, such as a pulse density modulated (PDM) signal, for example. In such embodiments, the IC (112, 122, or 132) may also include a PDM circuit. If the IC (112, 122, or 132) does not include an ADC, output line SIG may be an analog signal and the CODEC may include an ADC.

In still further embodiments, MEMS 110, 120, and 130 may be any type of transducer or microphone and are not limited to a capacitive MEMS microphones; IC 112, 122, and 132 may be any type of interface circuit and are not limited to an IC; and CODEC 108, 118, and 128 may be any type of processor, microprocessor, or integrated circuit, such as the CODEC or audio processor as shown for example.

According to various embodiments, microphones 104, 114, and 124 may be implemented as a packages with first dies containing MEMS 110, 120, and 130, respectively, and second dies including IC 112, 122, and 132, respectively. In some embodiments, MEMS 110, 120, or 130 and IC 112, 122, or 132, respectively, are integrated on the same IC. Microphone systems 100, 101, and 102 may each be implemented on a printed circuit board (PCB). In such embodiments, the detection circuit (106), the CODEC (108, 118, or 128), and the package containing the microphone (104, 114, or 124) are all attached to the PCB. In some embodiments, detection circuit 106 may be implemented as discrete circuit components. In other embodiments, detection circuit 116 is implemented as a portion of IC 122. In still other embodiments, detection circuit 126 is implemented as a portion of CODEC 128.

Figure 2A:
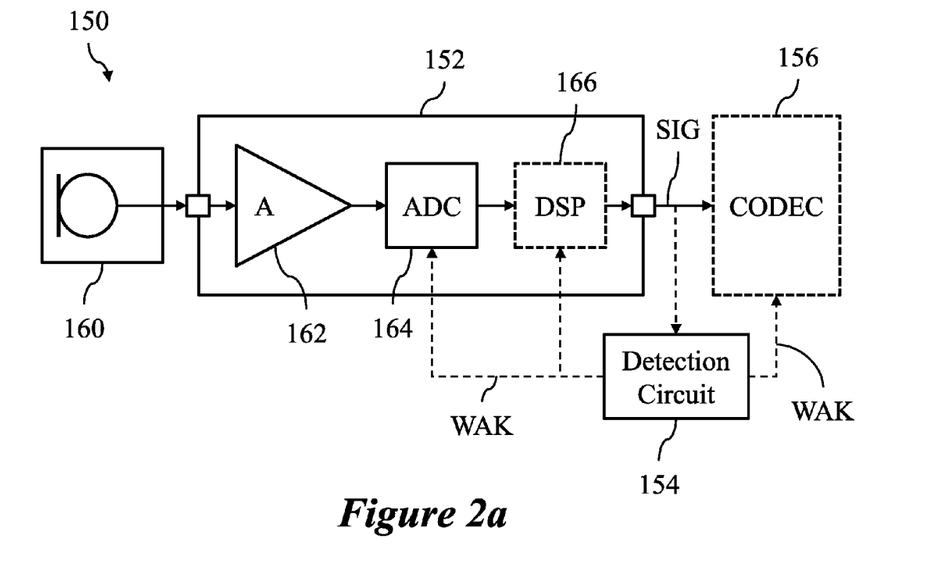
FIGS. 2a-2b illustrate block diagrams of further embodiment microphone systems.
Figure 2B:
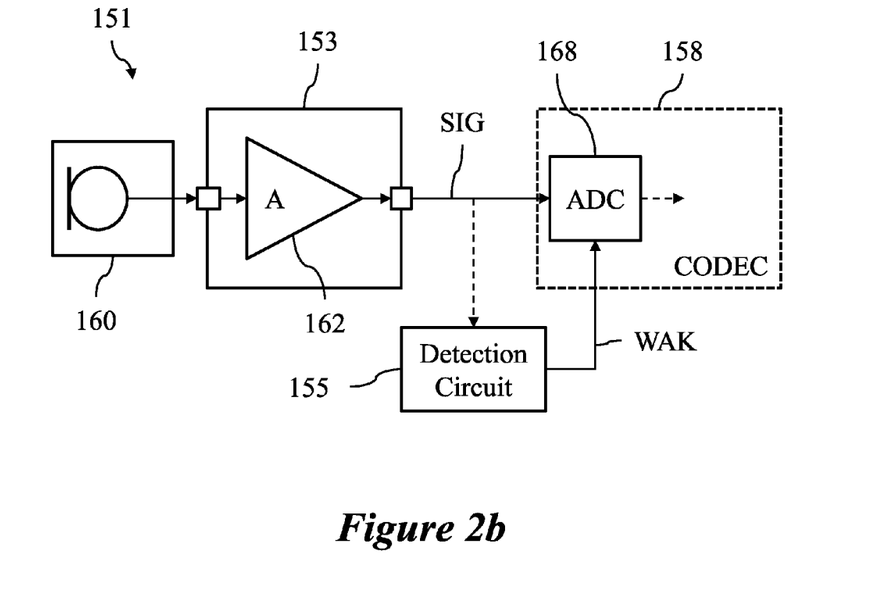

FIGS. 2a-2b illustrate block diagrams of further embodiment microphone systems 150 and 151. For example, microphone systems 150 and 151 may be implementations of microphone system 100 in FIG. 1a. FIG. 2a illustrates microphone system 150 including microphone 160, interface circuit 152, CODEC 156, and detection circuit 154. According to various embodiments, microphone system 150 comprises a digital microphone and interface circuit 152 produces a digital output signal on output line SIG. Microphone 160 produces a transduced signal from a sound wave and supplies the transduced signal to amplifier 162. ADC 164 converts the amplified analog signal to a digital signal and may provide the digital signal to an optional digital signal processor (DSP) 166. DSP circuit 166 supplies the digital output signal on output line SIG.

According to various embodiments, detection circuit 154 monitors output line SIG and compares the signal value on output line SIG to a wake-up or detection threshold. Based on the comparison between the detection threshold and the signal value, or an extracted parameter from the signal, on output line SIG, detection circuit 154 generates wake-up signal WAK and supplies the wake-up signal WAK to various components. In some embodiments, wake-up signal WAK is supplied as an enable/disable to ADC 164, DSP 166, and/or CODEC 156. Wake-up signal WAK selects between a low power mode and a normal operation mode. During the low power mode, some components within microphone system 150 may be disabled by wake-up signal WAK.

In some embodiments, microphone 160 may be another type of sensor or transducer, such as a pressure sensor or an accelerometer, for example. DSP 166 may implement a pulse density modulation (PDM) feature for modulating the digital output on output line SIG. ADC 164 may be implemented as any type of ADC, such as a sigma-delta (Σ-Δ) modulator, for example.

FIG. 2b illustrates microphone system 151 including microphone 160, interface circuit 153, CODEC 158, and detection circuit 155. According to various embodiments, microphone system 151 comprises an analog microphone and interface circuit 153 produces an analog output signal on output line SIG. As described above, a sound wave is transduced by microphone 160 and amplified by amplifier 162. The amplified signal is supplied as an analog signal on output line SIG to CODEC 158. CODEC 158 includes ADC 168 that converts the analog signal to a digital signal for other processing within CODEC 158.

According to various embodiments, detection circuit 155 monitors output line SIG and compares the signal value, or an extracted parameter from the signal, on output line SIG to a wake-up or detection threshold, similar to the embodiments described above. Based on the comparison between the detection threshold and the signal value, or the extracted parameter, on output line SIG, detection circuit 154 generates wake-up signal WAK and supplies the wake-up signal WAK to ADC 168 in CODEC 158. As before, wake-up signal WAK is operable to enable/disable or set in a low power mode ADC 168 and may also enable/disable or set in a low power mode other components in CODEC 158.

Similar to embodiments discussed above in reference to FIG. 1, microphone 160 may include any type of transducer or sensor and is not limited to a microphone. Interface circuits 152 and 153 may be implemented as numerous types of integrated circuits (ICs), semi- or full-custom ASICs, or combinations of discrete components. CODEC 158 may be a specialized processor, such as an audio processor, or may be implemented as any other type of processor, microprocessor, or IC. Also, detection circuits 154 and 155 may be incorporated into interface circuits 152 or 153 in some embodiments, or into CODEC 156 or 158 in other embodiments. In various embodiments, microphone systems 150 and 151 may each be implemented on a PCB. In further embodiments, detection circuits 154 and 155 may be implemented as discrete components attached to the PCB.

Figure 3A:
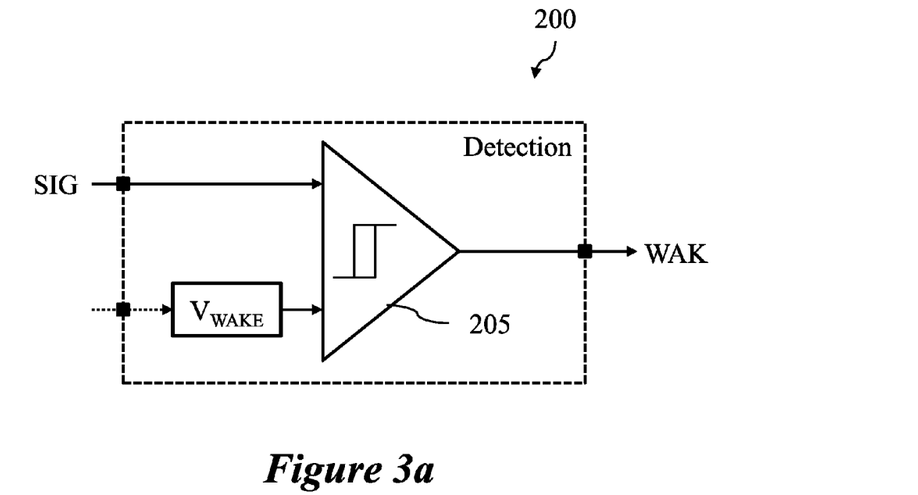
FIGS. 3a-3b illustrate block diagrams of embodiment detection circuits.
Figure 3B:
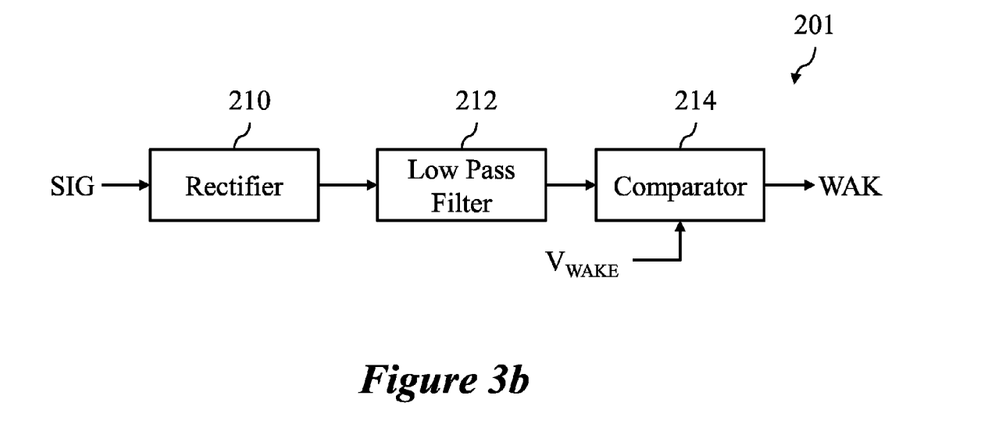

FIGS. 3a-3b illustrate block diagrams of embodiment detection circuits 200 and 201. FIG. 3a illustrates a simple block diagram of detection circuit 200 including a hysteresis comparator 205 with a wake-up threshold $V_{WAKE}$. Detection circuit 200 may be an implementation of any detection circuit described herein. According to various embodiments, comparator 205 receives an electrical signal corresponding to physical signal, such as a sound wave for example, on signal line SIG. Comparator 205 also receives wake-up threshold $V_{WAKE}$ on the other input and compares the electrical signal on signal line SIG to wake-up threshold $V_{WAKE}$. When the signal level on signal line SIG is below wake-up threshold $V_{WAKE}$, this may correspond to low or insignificant sound activity and comparator 205 generates a disable or sleep signal on wake-up line WAK. In various embodiments, wake-up line WAK may be coupled to any components used for sensing, conversion, and/or processing for a transducer system.

According to further embodiments, when the signal level on signal line SIG is above wake-up threshold $V_{WAKE}$, which may correspond to relevant sound activity, comparator 205 generates a wake-up or enable signal on wake-up line WAK. In some embodiments, comparator 205 implements a hysteresis characteristic. In such embodiments, once comparator 205 generates a wake-up or enable signal on wake-up line WAK, comparator 205 will continue to supply the enable signal on wake-up line WAK until the signal level on signal line SIG goes below wake-up threshold $V_{WAKE}$ by a hysteresis amount. Thus, if the signal level on signal line SIG drops to the wake-up threshold $V_{WAKE}$ or just below, comparator 205 may continue to supply the enable signal on wake-up line WAK.

According to various embodiments, between the output of comparator 205 and wake-up line WAK additional signal processing may be performed in order to selectively identify relevant acoustic activity. For example, counting the number of "high" states on the output of comparator 205 within a certain time frame may be performed in order to identify acoustic activity that is present in a specific time period. In such embodiments, when the count/time is above a threshold, the WAK signal may be set. In some embodiments, short acoustic activity occurring in time periods too short to reach the threshold may be ignored. In various embodiments, wake-up threshold $V_{wake}$ and the count/time threshold may be adjustable or programmable.

FIG. 3b illustrates a block diagram of detection circuit 201 including rectifier 210, low pass filter (LPF) 212, and comparator 214 with a wake-up threshold $V_{WAKE}$. Detection circuit 201 may be an implementation of any detection circuit described herein, such as detection circuit 200 for example. According to various embodiments, rectifier 210 receives a transduced signal on signal line SIG, rectifies the signal, and provides the signal to LPF 212. LPF 212 removes high frequency components from the transduced and rectified signal and provides the signal to comparator 214.

Comparator 214 compares the transduced, rectified, and filtered signal to wake-up threshold $V_{WAKE}$ and generates a wake-up signal on wake-up line WAK based on the comparison. In some embodiments, the wake-up signal is a static digital logic value that may take two states: (1) disable or (2) wake-up. When the wake-up signal has the first value, disable, components coupled to wake-up line WAK will be placed in a low power mode and some may be disabled. When the wake-up signal has the second value, wake-up, components coupled to wake-up line WAK will be placed in an operation mode and some may be enabled.

Figure 4:
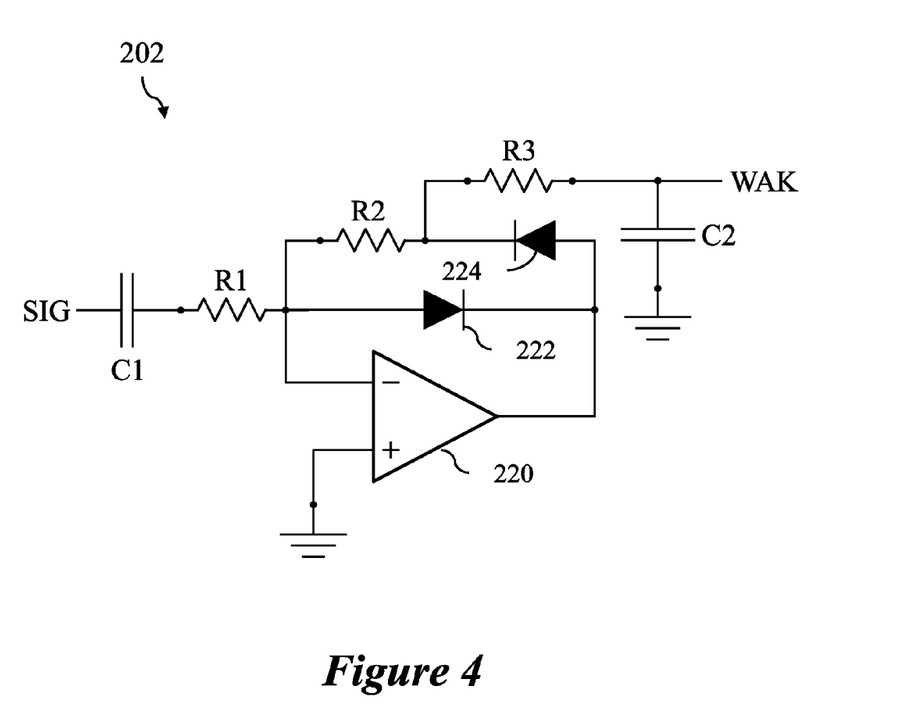
FIG. 4 illustrates a circuit diagram of another embodiment detection circuit.

FIG. 4 illustrates a circuit diagram of another embodiment detection circuit 202 including op-amp 220, and diodes 222 and 224. Detection circuit 202 may implement any of the detection circuits described herein, such as detection circuit 201 for example. According to various embodiments, detection circuit 202 receives an AC analog signal on signal line SIG. Capacitor C1, resistors R1 and R2, and diodes 222 and 224 with op-amp 220 remove the positive components of the AC signal (rectification), invert the negative components, and amplify the result. Resistor R3 and capacitor C2 filter the output signal on output OUT. Output OUT may be fed to a comparator (not shown) that generates the wake-up signal WAK, as described above.

Figure 5:
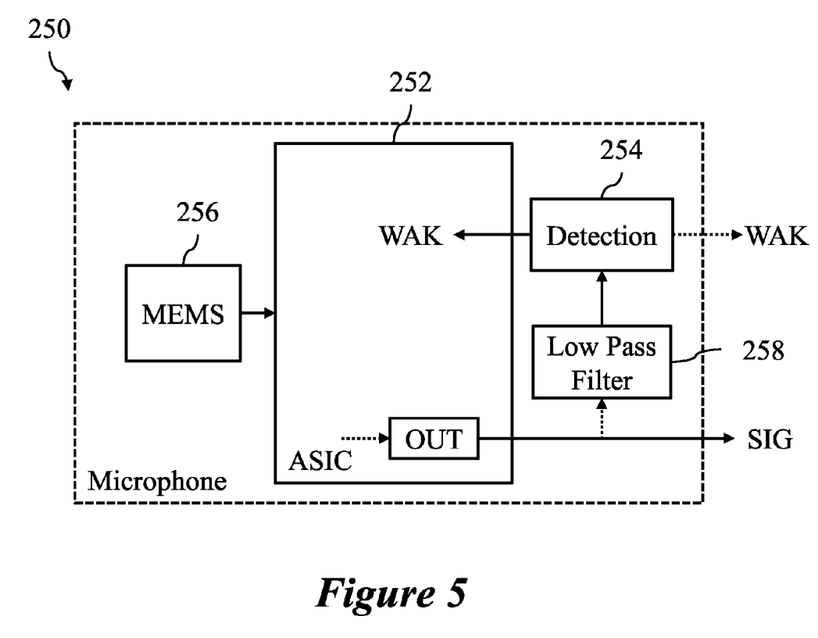
FIG. 5 illustrates a block diagram of an embodiment microphone with a detection circuit.

FIG. 5 illustrates a block diagram of an embodiment microphone 250 including capacitive MEMS transducer 256 coupled to IC 252. According to various embodiments microphone 250 also includes detection circuit 254 coupled to low pass filter (LPF) 258 that is coupled to output line SIG for microphone 250. In some embodiments, microphone 250 is a digital microphone that includes an ADC and output signal OUT is a digital output that is produced by converting a transduced analog signal from MEMS transducer 256 to a digital signal. In such embodiments, detection circuit 254 may be coupled to LPF 258 and implemented according to any of the embodiments described above and included with microphone 250. LPF 258 may generate a signal with a magnitude that is based on the output signal OUT on signal line SIG. Detection circuit 254 may compare the signal from LPF 258 to a wake-up threshold and generate wake-up signal on wake-up line WAK based on the comparison, as described previously above. The wake-up line WAK may also be coupled to an external processor, such as an audio processor or a CODEC, for example. The wake-up signal may disable certain components within IC 252, such as an ADC, when the signal from LPF 258 is below the wake-up threshold.

In alternative embodiments with digital microphones, IC 252 may include digital logic for performing wake-up detection fully integrated into the IC. As such, LPF 258 may be unnecessary and detection circuit 254 may be implemented as digital logic within IC 252.

Figure 6:
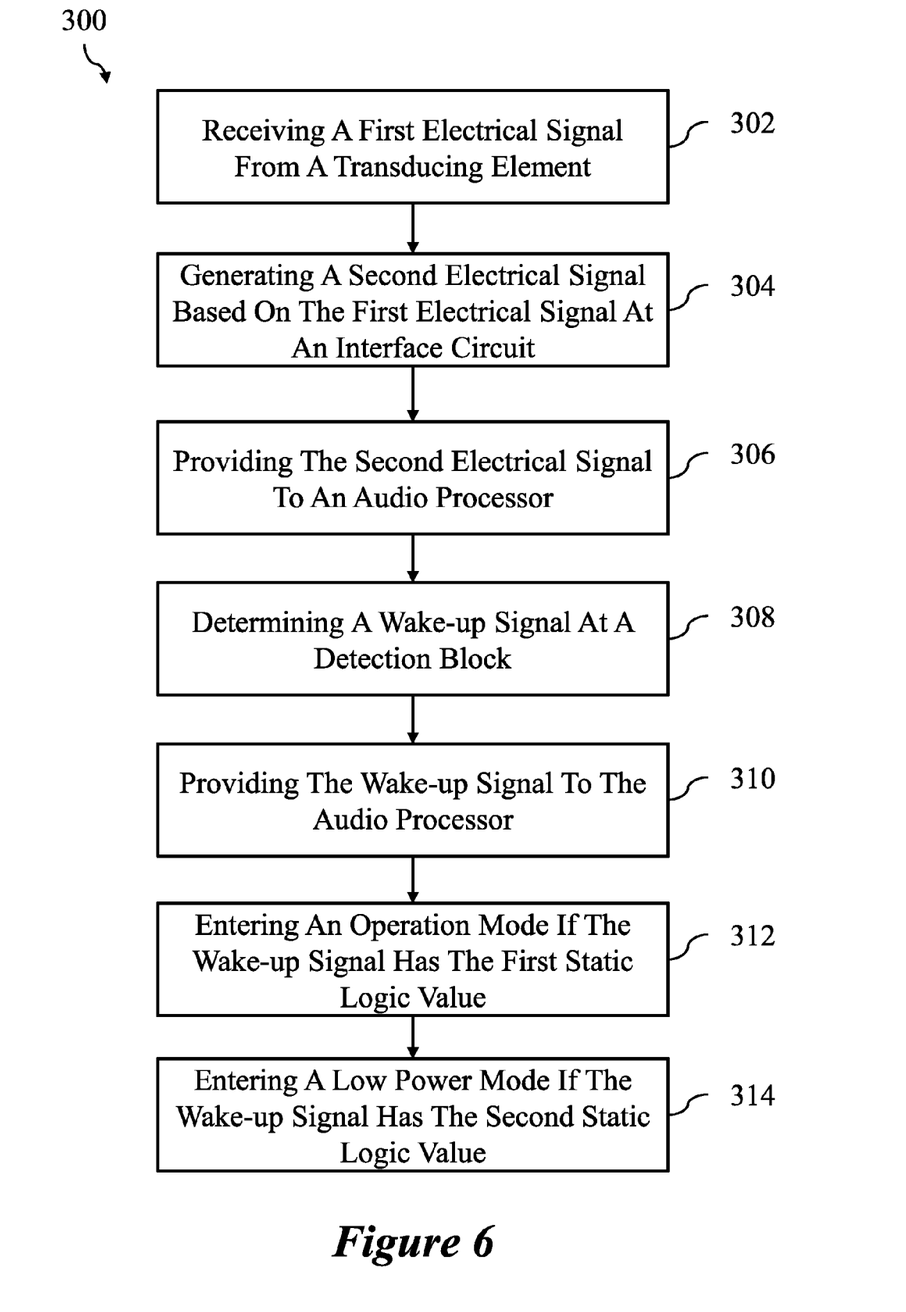
FIG. 6 illustrates a block diagram of a method of operation of an embodiment transducer system.

FIG. 6 illustrates a block diagram of a method of operation 300 of an embodiment transducer system including steps 302-314. According to various embodiments, step 302 includes receiving a first electrical signal from a transducing element. Then, a second electrical signal based on the first electrical signal is generated at an interface circuit in step 304. Step 306 includes providing the second electrical signal to an audio processor. In step 308, a wake-up signal is determined at a detection block. In some embodiments, the wake-up signal is determined by comparing the second electrical signal to a threshold value. In various embodiments, the wake-up signal has either a first static logic value or a second static logic value.

Following step 308, the wake-up signal is provided to the audio processor in step 310. Step 312 includes entering an operation mode if the wake-up signal has the first static logic value and step 314 includes entering a low power mode if the wake-up signal has the second static logic value. In other embodiments, steps 302-314 may be performed in any order.

According to various embodiments, a circuit includes an interface circuit configured to be coupled to a transducer and a detection circuit. The interface circuit is configured to provide a digital output signal to a signal input terminal of a processing circuit. The detection circuit is configured to receive the digital output signal and provide a low power enable signal to a low power enable terminal of the processing circuit. In the various embodiments, the digital output signal is based on a transduced signal from the transducer and the low power enable signal is determined by comparing the digital output signal to a first threshold.

In various embodiments, the circuit includes the transducer. The transducer may be a microphone. In some embodiments, the microphone is a capacitive MEMS microphone. The circuit may also include the processing circuit. In some embodiments, the low power enable signal is configured to enable a low power operation mode in the processing circuit when the digital output signal is above the first threshold. In further embodiments, the low power enable signal is configured to disable the low power operation mode in the processing circuit when the digital output signal is below a second threshold, the second threshold lower than the first. The processing circuit may be an audio processor.

In various embodiments, the processing circuit and the detection circuit are included in an audio processor and the audio processor is configured to receive the digital output signal, generate the low power enable signal internally, and enter a low power operation mode based on the low power enable signal.

In various embodiments, the interface circuit is configured to receive the low power enable signal from the detection circuit and the low power enable signal is operable to enable or disable portions of the interface circuit. The signal input terminal and the low power enable signal terminals may be different terminals. In some embodiments, the interface circuit and the detection circuit are disposed on a same integrated circuit. In other embodiments, the interface circuit and the detection circuit are attached to a same printed circuit board (PCB). The detection circuit may include discrete circuit components.

In various embodiments, the interface circuit includes an amplifier configured to be coupled to the transducer and an analog to digital converter (ADC) coupled to the amplifier. In some embodiments, the low power enable signal is determined by comparing an extracted parameter from the digital output signal with a first threshold. The extracted parameter may include a rectified and filtered value. In other embodiments, the extracted parameter is a counted number of digital values on the digital output signal above a first activity value within a first time period.

According to various embodiments, a microphone system includes a microelectromechanical system (MEMS) microphone, an interface circuit, and a detection circuit. The MEMS microphone is configured to generate a transduced signal. The interface circuit is coupled to the MEMS microphone and includes an amplifier. The interface circuit is configured to generate an analog output signal based on the transduced signal. The detection circuit is coupled to the interface circuit and configured to generate a wake-up signal based on comparing the analog output signal with a threshold.

In various embodiments, the microphone system includes an audio processor and the audio processor comprises a signal terminal configured to receive the analog output signal and a wake-up terminal configured to receive the wake-up signal. In some embodiments, the audio processor is configured to operate in a low power mode or an operation mode. The audio processor switches between the low power mode and the operation mode based on the wake-up signal. The interface circuit and the detection circuit may be disposed on a same integrated circuit.

In various embodiments, the microphone system includes a first package and the first package includes the MEMS microphone and the interface circuit. The first package and the detection circuit are attached to a printed circuit board (PCB). In some embodiments, the detection circuit comprises discrete circuit components. The detection circuit may be configured to generate the wake-up signal based on comparing an extracted parameter from the analog output signal with the threshold.

According to various embodiments, a circuit includes an interface circuit configured to be coupled to a microphone and to generate analog output signals, an audio processor including a signal input terminal configured to receive the analog output signals and a low power enable terminal, and a sound detection circuit coupled to the interface circuit and the audio processor. The sound detection circuit is configured to receive the analog output signals, generate a low power enable signal based on the analog output signals, and provide the low power enable signal to the low power enable terminal of the audio processor. The audio processor is configured to receive the low power enable signal from the sound detection circuit and operate in a low power mode or an operation mode based on the low power enable signal.

In various embodiments, the sound detection circuit determines the low power enable signal by comparing the analog output signals to a threshold value. The sound detection circuit and the interface circuit may be disposed on a same IC. The sound detection circuit and the interface circuit may be coupled to a same printed circuit board (PCB). In some embodiments, the sound detection circuit includes discrete circuit components. The sound detection circuit may include a rectifier, a low pass filter, and a comparator.

According to various embodiments, a method of operating a transducer system includes receiving a first electrical signal from a transducing element, generating a second electrical signal based on the first electrical signal at an interface circuit, providing the second electrical signal to an audio processor, determining a wake-up signal at a detection block, providing the wake-up signal to the audio processor, entering an operation mode if the wake-up signal has the first static logic value, and entering a low power mode if the wake-up signal has the second static logic value. The wake-up signal is determined by comparing the second electrical signal to a threshold value and the wake-up signal includes a first static logic value or a second static logic value.

In various embodiments, entering the operation mode includes operating the audio processor in a first operating mode and entering a low power mode includes operating the audio processor in a second operating mode with less power consumption than the first operating mode. The interface circuit may include an analog to digital converter (ADC) and the second electrical signal may include a digital signal. In some embodiments, the method also includes providing the wake-up signal to the interface circuit and disabling portions of the ADC when the wake-up signal has the second static logic value. The audio processor may include an analog to digital converter (ADC) and the second electrical signal may be an analog signal. The method may also include transducing a physical signal to generate the first electrical signal at a transducing element.

Various advantages of the embodiments described herein may include transducer systems with decreased power consumption. Embodiments may include systems that operate in a full resolution or normal operation mode and a low power mode. Operating in the low power mode may include disabling unused components and decreasing power consumption when not sensing signals with the transducer system. Further advantages include automatic switching from low power mode to full resolution mode based on physical signals, such as a sound wave, thereby implementing a form of acoustic wake-up detection.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A circuit, comprising:
    a CODEC comprising an analog to digital converter (ADC); and
    an interface circuit coupled to the CODEC and configured to provide an output signal to the ADC, the interface circuit comprising:
        a detection circuit configured to receive the output signal and to provide a low power enable signal to a low power enable terminal of the ADC, wherein the low power enable signal is operable to enable or disable portions of the CODEC, wherein the low power enable signal is generated based on a comparison of the output signal with a first threshold and a second threshold lower than the first threshold, wherein the output signal is configured to have a first range of signal levels above the first threshold, a second range of signal levels between the first threshold and the second threshold, and a third range of signal levels below the second threshold, wherein the low power enable signal is operable to disable a low power operation mode of the ADC in response to the output signal changing from the second range of signal levels to the first range of signal levels, wherein the low power enable signal is operable to disable the low power operation mode of the ADC in response to the output signal changing from the first range of signal levels to the second range of signal levels following a change from the second range of signal levels to the first range of signal levels, and wherein the low power enable signal is operable to enable the low power operation mode of the ADC in response to the output signal changing from the second range of signal levels to the third range of signal levels.

2. The circuit of claim 1, wherein the interface circuit further comprises an amplifier configured to generate the output signal.

3. The circuit of claim 2, wherein the amplifier and the interface circuit are disposed over an integrated circuit (IC).

4. The circuit of claim 3, wherein the IC is separate from the CODEC.

5. The circuit of claim 1, wherein the low power enable signal is generated based on a comparison of a signal value of the output signal with the first threshold.

6. The circuit of claim 1, wherein the detection circuit is configured to extract a parameter from the output signal, wherein the first range of signal levels, the second range of signal levels, and the third range of signal levels comprise the extracted parameter, and wherein the low power enable signal is generated based on a comparison of the extracted parameter with the first threshold and the second threshold.

7. The circuit of claim 6, wherein the extracted parameter comprises a rectified and filtered value.

8. The circuit of claim 6, wherein the extracted parameter comprises a counted number of values on the output signal above a first activity value within a first time period.

9. The circuit of claim 1, further comprising a transducer configured to provide a transduced signal to the interface circuit, wherein the output signal is generated based on the transduced signal from the transducer.

10. The circuit of claim 9, wherein the transducer comprises a capacitive MEMS microphone.

11. A circuit, comprising:
an interface circuit configured to provide a digital output signal to a CODEC, the interface circuit comprising:
an analog to digital convertor (ADC) configured to output a first digital signal; and
a detection circuit configured to receive the digital output signal and to provide a low power enable signal to a low power enable terminal of the ADC, wherein the low power enable signal is operable to enable or disable portions of the ADC, wherein the low power enable signal is generated based on a comparison of the digital output signal with a first threshold and a second threshold lower than the first threshold, wherein the digital output signal is configured to have a first range of signal levels above the first threshold, a second range of signal levels between the first threshold and the second threshold, and a third range of signal levels below the second threshold, wherein the low power enable signal is operable to disable a low power operation mode of the ADC in response to the digital output signal changing from the second range of signal levels to the first range of signal levels, wherein the low power enable signal is operable to disable the low power operation mode of the ADC in response to the digital output signal changing from the first range of signal levels to the second range of signal levels following a change from the second range of signal levels to the first range of signal levels, and wherein the low power enable signal is operable to enable the low power operation mode of the ADC in response to the digital output signal changing from the second range of signal levels to the third range of signal levels.

12. The circuit of claim 11, further comprising the CODEC, wherein the detection circuit is further configured to provide the low power enable signal to a low power enable terminal of the CODEC, and wherein the low power enable signal is operable to enable or disable portions of the CODEC.

13. The circuit of claim 11, wherein the interface circuit is disposed over an integrated circuit (IC) separate from the CODEC.

14. The circuit of claim 11, wherein the interface circuit further comprises a digital signal processor (DSP) coupled to an output of the ADC, and wherein the low power enable signal is further operable to enable or disable the DSP.

15. The circuit of claim 14, wherein the DSP is configured to generate the digital output signal based on the first digital signal.

16. The circuit of claim 11, wherein the first digital signal is the digital output signal.

17. The circuit of claim 11, wherein the interface circuit and the CODEC are disposed on a same integrated circuit.

18. The circuit of claim 11, wherein the interface circuit and the CODEC are attached to a same printed circuit board (PCB).

19. A microphone system, comprising:
a microelectromechanical system (MEMS) microphone configured to generate a transduced signal;
an interface circuit coupled to the MEMS microphone and configured to generate an output signal based on the transduced signal;
a CODEC coupled to the interface circuit and configured to receive the output signal; and
a detection circuit configured to receive the output signal and provide a low power enable signal to a low power enable terminal of the CODEC, wherein the low power enable signal is operable to enable or disable the CODEC, wherein the low power enable signal is generated based on a comparison of the output signal with a first threshold and a second threshold lower than the first threshold, wherein the output signal is configured to have a first range of signal levels above the first threshold, a second range of signal levels between the first threshold and the second threshold, and a third range of signal levels below the second threshold, wherein the low power enable signal is operable to disable a low power operation mode of the CODEC in response to the output signal changing from the second range of signal levels to the first range of signal levels, wherein the low power enable signal is operable to disable the low power operation mode of the CODEC in response to the output signal changing from the first range of signal levels to the second range of signal levels following a change from the second range of signal levels to the first range of signal levels, and wherein the low power enable signal is operable to enable the low power operation mode of the CODEC in response to the output signal changing from the second range of signal levels to the third range of signal levels.

20. The microphone system of claim 19, wherein the interface circuit comprises an analog to digital convertor (ADC), and wherein the low power enable signal is further operable to enable or disable the ADC.

21. The microphone system of claim 20, wherein the interface circuit further comprises a digital signal processor (DSP), wherein the output signal comprises a digital output signal of the DSP, and wherein the low power enable signal is further operable to enable or disable the DSP.

22. The microphone system of claim 19, wherein the interface circuit comprises the detection circuit.

23. The microphone system of claim 19, wherein the CODEC comprises the detection circuit.

* * * * *